United States Patent
Hulett

(10) Patent No.: US 6,402,103 B1
(45) Date of Patent: Jun. 11, 2002

(54) COFFEE FILTER HOLDER

(76) Inventor: Cynthia Beret Hulett, 1900 Hannaford St., Helena, MT (US) 59601

( * ) Notice: Subject to any disclaimer, the term of this patent is extended or adjusted under 35 U.S.C. 154(b) by 0 days.

(21) Appl. No.: 09/607,455

(22) Filed: Jun. 30, 2000

(51) Int. Cl.[7] ................................................. A47G 1/17
(52) U.S. Cl. ..................... 248/205.3; 248/684; 221/220
(58) Field of Search .............................. 248/205.3, 683, 248/146, 154, 525, 519, 346.01, 176.1, 684; 221/45, 62, 210; 206/449–553; 111/118; D7/400; 211/49.1, 125, 59.1

(56) References Cited

U.S. PATENT DOCUMENTS

| | | | | |
|---|---|---|---|---|
| 2,102,542 A | * | 12/1937 | Markle, Jr. ................. 269/54.5 |
| 2,385,296 A | * | 9/1945 | Moore ..................... 248/205.3 |
| 2,655,331 A | * | 10/1953 | Merritt ........................ 248/523 |
| 2,924,330 A | * | 2/1960 | Ballard ........................ 206/493 |
| 3,538,866 A | * | 11/1970 | Gaines ........................ 248/146 |
| 3,912,249 A | * | 10/1975 | Vaca .......................... 269/54.5 |
| D283,384 S | | 4/1986 | Jackson |
| 4,674,635 A | | 6/1987 | Huldin et al. |
| 4,750,702 A | * | 6/1988 | Neil et al. ................... 248/523 |
| 4,805,801 A | | 2/1989 | Knopf |
| 4,848,815 A | * | 7/1989 | Molloy ........................ 294/1.1 |
| 4,880,112 A | * | 11/1989 | Conrad ........................ 206/216 |
| 4,957,217 A | * | 9/1990 | Ritson ......................... 221/210 |
| 5,388,724 A | | 2/1995 | Adams et al. |
| D363,181 S | | 10/1995 | Leviness |
| 5,671,865 A | | 9/1997 | Sarris |
| 5,865,889 A | * | 2/1999 | Birtalan et al. ................ 118/13 |
| 6,273,293 B1 | * | 8/2001 | Carlson ......................... 221/37 |

* cited by examiner

*Primary Examiner*—Leslie A. Braun
*Assistant Examiner*—Gwendolyn Baxter

(57) ABSTRACT

A coffee filter holder for holding coffee filters in a position for easy retrieval. The coffee filter holder includes an elongate member. The elongate member has a first end and a second end. The elongate member has a generally planar front side and a generally planar back side. An adhesive material is securely attached to the back side of the elongate member. A rod has a first end and a second end. The rod extends through the elongate member and is positioned generally between the first and second ends of the elongate member. The first end of the rod extends away from the front side of the elongate member. The first end of the rod is pointed.

3 Claims, 1 Drawing Sheet

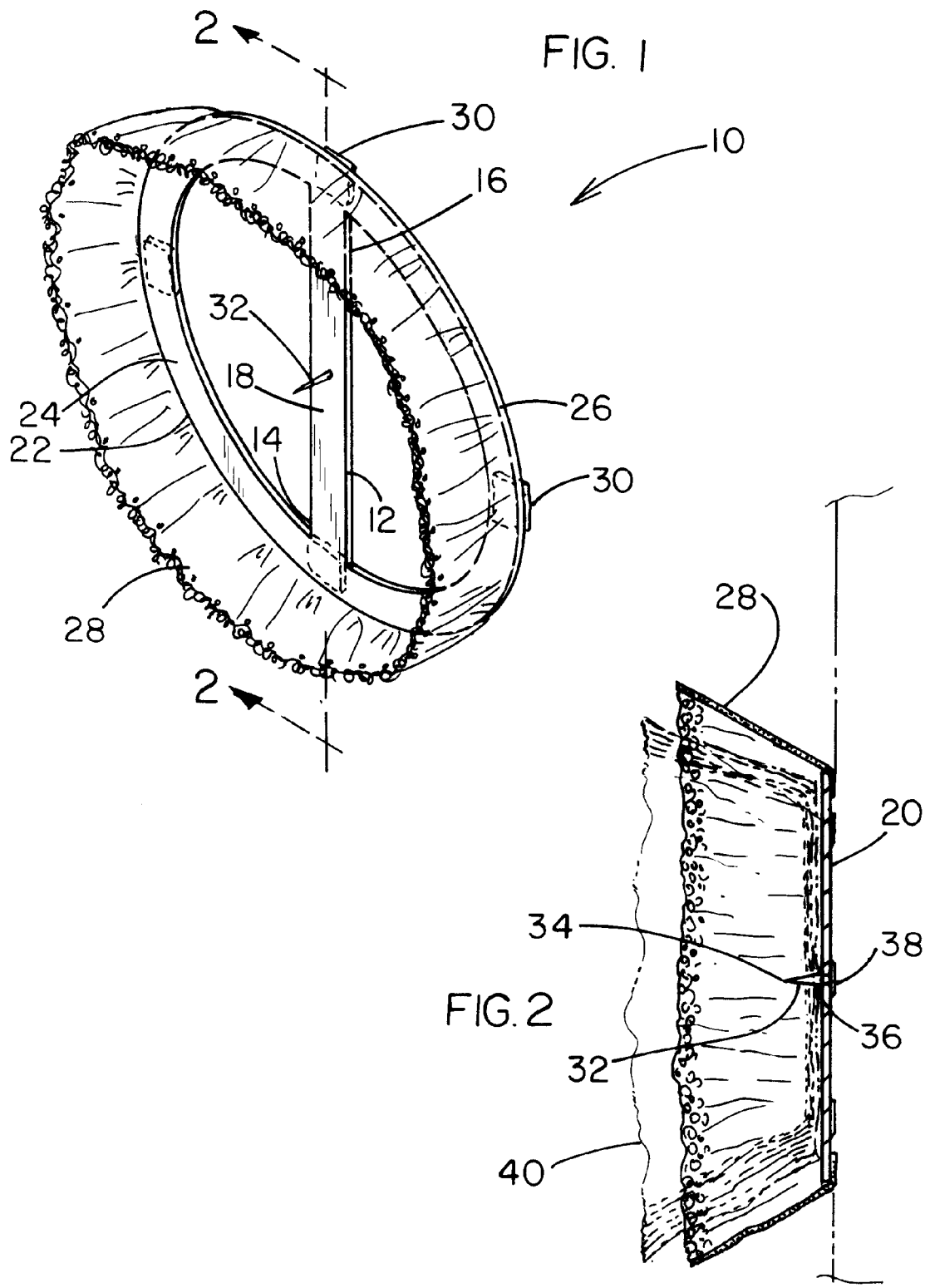

COFFEE FILTER HOLDER

BACKGROUND OF THE INVENTION

1. Field of the Invention

The present invention relates to coffee filter holding devices and more particularly pertains to a new coffee filter holder for holding coffee filters in a position for easy retrieval.

2. Description of the Prior Art

The use of coffee filter holding devices is known in the prior art. More specifically, coffee filter holding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,388,724; U.S. Pat. No. 4,805,801; U.S. Pat. No. 4,674,635; U.S. Pat. No. 5,671,865; U.S. Pat. No. 363,181; and U.S. Des. Pat. No. 283,384.

While these devices fulfill their respective, particular objectives and requirements, the aforementioned patents do not disclose a new coffee filter holder. The inventive device includes an elongate member. The elongate member has a first end and a second end. The elongate member has a generally planar front side and a generally planar back side. An adhesive material is securely attached to the back side of the elongate member. A rod has a first end and a second end. The rod extends through the elongate member and is positioned generally between the first and second ends of the elongate member. The first end of the rod extends away from the front side of the elongate member. The first end of the rod is pointed.

In these respects, the coffee filter holder according to the present invention substantially departs from the conventional concepts and designs of the prior art, and in so doing provides an apparatus primarily developed for the purpose of holding coffee filters in a position for easy retrieval.

SUMMARY OF THE INVENTION

In view of the foregoing disadvantages inherent in the known types of coffee filter holding devices now present in the prior art, the present invention provides a new coffee filter holder construction wherein the same can be utilized for holding coffee filters in a position for easy retrieval.

The general purpose of the present invention, which will be described subsequently in greater detail, is to provide a new coffee filter holder apparatus and method which has many of the advantages of the coffee filter holding devices mentioned heretofore and many novel features that result in a new coffee filter holder which is not anticipated, rendered obvious, suggested, or even implied by any of the prior art coffee filter holding devices, either alone or in any combination thereof.

To attain this, the present invention generally comprises an elongate member. The elongate member has a first end and a second end. The elongate member has a generally planar front side and a generally planar back side. An adhesive material is securely attached to the back side of the elongate member. A rod has a first end and a second end. The rod extends through the elongate member and is positioned generally between the first and second ends of the elongate member. The first end of the rod extends away from the front side of the elongate member. The first end of the rod is pointed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new coffee filter holder apparatus and method which has many of the advantages of the coffee filter holding devices mentioned heretofore and many novel features that result in a new coffee filter holder which is not anticipated, rendered obvious, suggested, or even implied by any of the prior art coffee filter holding devices, either alone or in any combination thereof.

It is another object of the present invention to provide a new coffee filter holder which may be easily and efficiently manufactured and marketed.

It is a further object of the present invention to provide a new coffee filter holder which is of a durable and reliable construction.

An even further object of the present invention is to provide a new coffee filter holder which is susceptible of a low cost of manufacture with regard to both materials and labor, and which accordingly is then susceptible of low prices of sale to the consuming public, thereby making such coffee filter holder economically available to the buying public.

Still yet another object of the present invention is to provide a new coffee filter holder which provides in the apparatuses and methods of the prior art some of the advantages thereof, while simultaneously overcoming some of the disadvantages normally associated therewith.

Still another object of the present invention is to provide a new coffee filter holder for holding coffee filters in a position for easy retrieval.

Yet another object of the present invention is to provide a new coffee filter holder which includes an elongate member.

The elongate member has a first end and a second end. The elongate member has a generally planar front side and a generally planar back side. An adhesive material is securely attached to the back side of the elongate member. A rod has a first end and a second end. The rod extends through the elongate member and is positioned generally between the first and second ends of the elongate member. The first end of the rod extends away from the front side of the elongate member. The first end of the rod is pointed.

Still yet another object of the present invention is to provide a new coffee filter holder that has a skirting material thereon for preventing dust from settling on the coffee filters.

Even still another object of the present invention is to provide a new coffee filter holder that is easily mountable to existing walls.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new coffee filter holder according the present invention.

FIG. 2 is a schematic side cross-sectional view taken along line 2—2 of the present invention.

DESCRIPTION OF THE PREFERRED EMBODIMENT

With reference now to the drawings, and in particular to FIGS. 1 and 2 thereof, a new coffee filter holder embodying the principles and concepts of the present invention and generally designated by the reference numeral 10 will be described.

As best illustrated in FIGS. 1 and 2, the coffee filter holder 10 generally comprises an elongate member 12. The elongate member has a first end 14 and a second end 16. The elongate member 12 has a generally planar front side 18 and a generally planar back side 20. The elongate member 12 preferably comprises a substantially rigid material which may preferably be wood, metal or plastic.

An annular member 22 has a front surface 24, a back surface, not shown, and a peripheral edge 26. The front 24 and back surfaces are generally planar. The elongate member 12 is securely attached to the annular member 22 such that the elongate member 12 is generally aligned along a diameter of the annular member 22. The elongate member 12 preferably has a length generally equal to the inner diameter of the annular member. That length is ideally between 4½ and 6½ inches. The annular member 22 preferably comprises a substantially rigid material.

A skirting material 28 is coupled to and extends away from the peripheral edge 26 of the annular member 22. The skirting material 28 ideally comprises a lace material though any material may be used. The skirting material 28 provide protection from dust which may settle on any coffee filters which are being held by the device.

A conventional adhesive material 30 is securely attached to the back surface of the annular member 22 and the back side 20 of the elongate member 12.

A rod 32 has a first end 34 and a second end 36. The rod extends through the elongate member 12 and is positioned generally between the first 14 and second 16 ends of the elongate member 12. The first end 34 of the rod. 32 extends away from the front side 18 of the elongate member 12. The first end 34 of the rod 32 is pointed. A plate 38 is integrally coupled to the second end 36 of the rod 32 and generally abuts against the back side 20 of the elongate member 12.

In use, the device 10 is placed on a vertical surface using the adhesive material 30. A plurality of coffee filters 40 is first turned inside out which allows the filters to pull away from each other for ease of retrieving individual filters. The first end 34 of the rod 32 is extended through a central portion of a plurality of the coffee filters 40. The coffee filters 40 are held in place until needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coffee filter holding device comprising:

an elongate member, said elongate member having a first end and a second end, said elongate member having a generally planar front side and a generally planar back side;

an adhesive material for securing said elongate member to a surface, said adhesive material being securely attached to said back side of said elongate member; and a single lancing rod for lancing filters to hold the filters in a position adjacent to said elongate member, said lancing rod having a first end and a second end, said lancing rod extending through said elongate member, said lancing rod being positioned generally between said first and second ends of said elongate member, said first end of said lancing rod extending away from said front side of said elongate member, said first end of said lancing rod being pointed;

an annular member extending about said elongate member, said annular member having a front surface, a back surface and a peripheral edge, said front and back surfaces being generally planar, said elongate member being attached to said annular member such that said elongate member is generally positioned along a diameter of said annular member.

2. A coffee filter holding device comprising:

an elongate member, said elongate member having a first end and a second end, said elongate member having a generally planar front side and a generally planar back side;

an adhesive material for securing said elongate member to a surface, said adhesive material being securely attached to said back side of said elongate member; and a single lancing rod for lancing filters to hold the filters in a position adjacent to said elongate member, said lancing rod having a first end and a second end, said lancing rod extending through said elongate member, said lancing rod being positioned generally between said first and second ends of said elongate member, said first end of said lancing rod extending away from said front side of said elongate member, said first end of said lancing rod being pointed;

an annular member extending about said elongate member, said annular member having a front surface, a back surface and a peripheral edge, said front and back surfaces being generally planar, said elongate member being attached to said annular member such that said elongate member is generally positioned along a diameter of said annular member;

a skirting material for obscuring viewing of said elongate and annular members and sides of any filters mounted on said lancing rod, said skirting material being coupled to a back surface of said annular member and extending away from said peripheral edge of said annular member in a same general direction as said lancing rod.

3. A coffee filter holding device comprising:

an elongate member, said elongate member having a first end and a second end, said elongate member having a generally planar front side and a generally planar back side, said elongate member comprising a substantially rigid material;

an annular member extending about said elongate member, said annular member having a front surface, a back surface and a peripheral edge, said front and back surfaces being generally planar, said elongate member being securely attached to said annular member such that said elongate member is generally positioned along a diameter of said annular member, said elongate member having a length generally equal to an inner diameter of said annular member, said annular member comprising a substantially rigid material;

a skirting material for obscuring viewing of said elongate and annular members and sides of any filters mounted on said lancing rod, said skirting material being coupled to a back surface of said annular member and extending away from said peripheral edge of said annular member, said skirting material comprising a lace material;

an adhesive material for securing said elongate member and said annular member to a surface, said adhesive material being securely attached to said back surface of said annular member and said back side of said elongate member;

a single lancing rod for lancing filters to hold the filters in a position adjacent to said elongate member, said lancing rod having a first end and a second end, said lancing rod extending through said elongate member, said lancing rod being positioned generally between said first and second ends of said elongate member, said first end of said lancing rod extending away from said front side of said elongate member, said first end of said lancing rod being pointed, a plate being integrally coupled to said second end of said rod and generally abutted against said back side of said elongate member; and wherein said first end of said rod is extendable through a central portion of a plurality of the coffee filters.

* * * * *